United States Patent [19]

Quinn et al.

[11] Patent Number: 4,621,132

[45] Date of Patent: Nov. 4, 1986

[54] BRANCHED COPOLYESTER-CARBONATE RESINS

[75] Inventors: Clayton B. Quinn; William Hilakos, both of Mt. Vernon, Ind.

[73] Assignee: General Electric Company, Mt. Vernon, Ind.

[21] Appl. No.: 625,260

[22] Filed: Jun. 27, 1984

Related U.S. Application Data

[63] Continuation-in-part of Ser. No. 452,120, Dec. 22, 1982, abandoned.

[51] Int. Cl.[4] .............................................. C08G 63/64
[52] U.S. Cl. ................................... 528/194; 528/125; 528/126; 528/128; 528/176; 528/193; 528/195
[58] Field of Search ............... 528/125, 126, 128, 176, 528/193–195

[56] References Cited

U.S. PATENT DOCUMENTS

| | | | |
|---|---|---|---|
| 4,238,597 | 12/1980 | Markezich et al. | 528/126 |
| 4,286,083 | 8/1981 | Kochanowski | 528/173 |
| 4,294,953 | 10/1981 | Quinn et al. | 528/194 |
| 4,349,658 | 9/1982 | Mark et al. | 528/176 |
| 4,454,278 | 6/1984 | Fox et al. | 528/176 |

FOREIGN PATENT DOCUMENTS

| | | | |
|---|---|---|---|
| 55-33737 | 9/1980 | Japan | 528/176 |

*Primary Examiner*—Harold D. Anderson
*Attorney, Agent, or Firm*—Myron B. Kapustij; Martin B. Barancik

[57] ABSTRACT

Thermoplastic randomly branched copolyester-carbonate resin containing from about 40 mole percent to about 90 mole percent ester bonds which is particularly suited for blow molding operations. This branched copolyester-carbonate resin is obtained by reacting a carbonate precursor, at least one dihydric phenol, at least one ester forming reactive derivative of a difunctional carboxylic acid, and a polyfunctional aromatic branching agent.

23 Claims, No Drawings

BRANCHED COPOLYESTER-CARBONATE RESINS

RELATED APPLICATIONS

This application is a continuation-in-part application of copending application Ser. No. 452,120, filed Dec. 22, 1982 and now abandoned.

BACKGROUND OF THE INVENTION

Copolyester-carbonate resins are well known thermoplastic materials which, due to their many excellent properties, are finding increasing use as thermoplastic engineering materials in many commercial and industrial applications. These polymers have outstanding mechanical, thermal and optical properties such as high tensile strength, optical clarity, thermal and dimensional stability and impact strength. The copolyester-carbonates are typically prepared by reacting (i) a carbonate precursor, (ii) a difunctional carboxylic acid, and (iii) a dihydric phenol to provide a linear polymer consisting of units of the dihydric phenol linked to one another through carbonate and ester linkages.

These copolyester-carbonates differ from most thermoplastic polymers in their melt rheology behavior. Most thermoplastic polymers exhibit non-Newtonian flow characteristics over essentially all melt processing conditions. Newtonian flow is defined as the type of flow occurring in a liquid system where the rate of shear is directly proportional to the shearing force. However, in contrast to most thermoplastic polymers, copolyester-carbonates prepared from dihydric phenols exhibit substantially Newtonian flow at normal processing temperatures and shear rates.

Two other characteristics of molten thermoplastic polymers are considered to be significant for molding operations: melt elasticity and melt strength. Melt elasticity is the recovery of the elastic energy stored within the melt from distortion or orientation of the molecules by shearing stresses. Melt strength may be simply described as the tenacity of a molten strand and indicates the ability of the melt to support a stress. Both of these characteristics are important in extrusion blow molding, particularly in fabrication by extrusion blow molding. Non-Newtonian flow characteristics tend to impart melt elasticity and melt strength to polymers thus allowing their use in blow molding fabrication. In the usual blow molding operation, a tube of molten thermoplastic is extruded vertically downward into a mold, followed by the introduction of a gas, such as air, into the tube thus forcing the molten plastic to conform to the shape of the mold. The length of the tube and the quantity of material forming the tube are limiting factors in determining the size and wall thickness of the objects that can be molded by this process. The fluidity of the melt obtained from conventional copolyester-carbonates such as those derived from bisphenol-A, or the lack of melt strength as well as the paucity of extruate swelling, serve to limit blow molding applications to relatively small, thin walled parts. Temperature must generally be carefully controlled to prevent the extruded tube from falling away before its attains the desired length and the mold is closed around it for blowing. Consequently, the Newtonian behavior of linear conventional copolyester-carbonate resin melts has severely restricted their use in the production of large hollow bodies by conventional extrusion blow molding operations as well as the production of various other shapes by profile extrusion methods.

There thus exists a need for copolyester-carbonate resins which lend themselves to blow molding operations. Branched copolyester-carbonates lend themselves to blow molding operations. A process for preparing branched copolyester-carbonates from (a) a carbonate precursor, (b) a dihydric phenol, and (c) a difunctional carboxylic acid is disclosed in U.S. Pat. No. 4,286,083. However, the branched copolyester-carbonates obtainable by this process contain a relatively low ester content. It is an object of the instant invention to provide branched copolyester-carbonates containing a relatively high ester content.

BRIEF SUMMARY OF THE INVENTION

In accordance with the instant invention there are provided novel thermoplastic randomly branched copolyester-carbonate resins having a relatively high ester content. These randomly branched copolyester-carbonates are prepared by reacting (i) a carbonate precursor, (ii) at least one ester forming reactive derivative of a difunctional carboxylic acid, (iii) at least one dihydric phenol, and (iv) a minor amount of a polyfunctional organic compound. These randomly branched copolyester-carbonates exhibit excellent heat resistance and high melt strength which makes them suitable for the fabrication of blow molded articles. These randomly branched thermoplastic copolyester-carbonate resins also exhibit unique properties of non-Newtonian flow and melt elasticity which, combined with their melt strength and heat resistance, makes them uniquely suited for use as blow molding grade resins.

DESCRIPTION OF THE INVENTION

The instant invention is directed to novel thermoplastic randomly branched copolyester-carbonate resins containing a relatively high ester content. More particularly, the instant invention provides randomly branched copolyester-carbonate resins useful as blow molding grade resins.

The thermoplastic randomly branched copolyester-carbonate resins of the instant invention are produced by the reaction of (i) a carbonate precursor, (ii) at least one ester forming reactive derivative of a difunctional carboxylic acid, (iii) at least one dihydric phenol, and (iv) a minor amount of a polyfunctional organic compound.

Briefly stated, the copolyester-carbonates of this invention comprise recurring carbonate groups

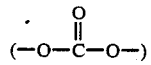

carboxylate groups

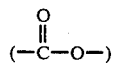

and aromatic carbocyclic groups in the randomly branched polymer is which at least some of the carboxylate groups and at least some of the carbonate groups are bonded directly to the ring carbon atoms of the aromatic carbocyclic groups.

The instant branched copolyester-carbonate polymers contain ester bonds and carbonate bonds in the polymer, wherein the amount of the ester bonds (the ester content) is in the range of from about 40 to about 90 mole percent, preferably from about 45 to about 90 mole percent, more preferably from about 50 to about 90 mole percent, and most preferably from about 55 to about 90 mole percent relative to the carbonate bonds. For example, 5 moles of bisphenol-A reacting completely with 4 moles of isophthaloyl dichloride and 1 mole of phosgene would give a copolyester-carbonate of 80 mole percent ester bonds (ester content).

The copolyester-carbonate resins of the instant invention exhibit properties of non-Newtonian flow, improved melt elasticity, melt strength, and heat resistance (e.g., heat distortion temperature under load) as compared to conventional prior art linear copolyester-carbonate resins.

The dihydric phenols useful in preparing the thermoplastic randomly branched copolyester-carbonate resins of the instant invention will in general conform to the general formula

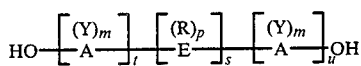

I.

in which A is an aromatic group such as phenylene, biphenylene, naphthylene, anthrylene, etc. E may be an alkylene or alkylidene group such as methylene, ethylene, propylene, propylidene, butylene, butylidene, isobutylidene, amylene, isoamylene, amylidene, isoamylidene, etc. Where E is an alkylene of alkylidene group, it may also consist of two or more alkylene or alkylidene groups connected by a non-alkylene or non-alkylidene group such as an aromatic linkage, a tertiary amino linkage, a carbonyl linkage, a silicon containing linkage, or by a sulfur containing linkage such as sulfide, sulfoxide, sulfone, etc. In addition E may be a cycloaliphatic group such as a cycloalkylene or cycloalkylidene group (e.g., cyclopentylene, cyclohexylene, cyclohexylidene, etc.); a sulfur-containing linkage such as a sulfide, sulfoxide or sulfone; an ether linkage; a carbonyl group; a tertiary nitrogen group; or a silicon containing linkage such as silane or siloxy. R is hydrogen or a monovalent hydrocarbon group such as alkyl (e.g., methyl, propyl, isopropyl, butyl, isobutyl, tertiary butyl etc.), aryl (e.g., pehnyl, naphthyl, biphenyl, etc.), aralkyl or alkaryl (e.g., benzyl, tolyl, ethylphenyl, etc.), or a cycloaliphatic group such as a cycloalkyl (e.g., cyclopentyl, cyclohexyl, etc.). Y may be a inorganic atom such as chlorine, bromine, fluorine, etc.; an inorganic group such as the nitro group, etc.; an organic group such as R above; or an oxy group such as OR; it being only necessary that Y be inert to and unaffected by the reactants and reaction conditions. The letter m is any whole number from and including zero through the number of positions on A available for substitution; p is any whole number from and including zero through the number of positions on E available for substitution; t is a whole number equal to at least one; s is either zero or one; and u is any whole number including zero.

In the dihydric phenol compound represented by Formula I when more than one Y substituent is present they may be the same or different. The same is true for the R substituent. Where s is zero in Formula I and u is not zero, the aromatic rings are directly joined with no intervening alkylene or other bridge. The positions of the hydroxyl groups and Y on the aromatic nuclear residues A can be varied in the ortho, meta, or para positions and the groupings can be in a vicinal, asymmetrical or symmetrical relationship where two or more ring carbon atoms of the aromatic hydrocarbon residue are substituted with Y and hydroxyl group.

Some illustrative non-limiting examples of dihydric phenols represented by Formula I include;
2,2-bis(4-hydroxyphenyl)propane (bisphenol-A);
2,2'-dihydroxydiphenylmethane;
bis(2-hydroxyphenyl)methane;
bis(4-hydroxyphenyl)methane;
1,1-bis(4-hydroxyphenyl)ethane;
1,1-bis(4-hydroxy-2-chlorophenyl)ethane;
1,1-bis(3,5-dimethyl-4-hydroxyphenyl)ethane;
1,1-bis(3,5-dibromo-4-hydroxyphenyl)propane;
2,2-bis(3,5-dimethyl-4-hydroxyphenyl)propane;
2,2-bis(3-phenyl-4-hydroxyphenyl)propane;
1,1-bis(4-hydroxyphenyl)cyclohexane;
bis(4-hydroxyphenyl)sulfone;
5'-chloro-2,4'-dihydroxydiphenyl sulfone; and the like.

Some other dihydric phenols falling within the scope of Formula I are disclosed in U.S. Pat. No. 3,169,121, which is hereby incorporated by reference.

Preferred dihydric phenols, from the standpoint of the instant invention, are those represented by the general formula

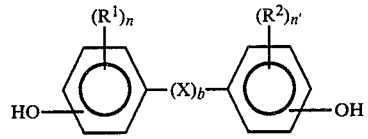

II.

wherein:

$R^1$ is independently selected from halogen radicals, monovalent hydrocarbon radicals, and monovalent hydrocarbonoxy radicals;

$R^2$ is independently selected from halogen radicals, monovalent hydrocarbon radicals, and monovalent hydrocarbonoxy radicals;

X is selected from divalent hydrocarbon radicals,

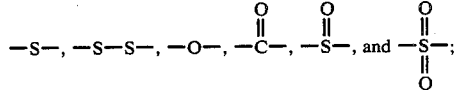

n and n' are independently selected from whole numbers having a value of from 0 to 4 inclusive;

b is either zero or one.

The monovalent hydrocarbon radicals represented by $R^1$ and $R^2$ are selected from alkyl radicals, aryl radicals, aralkyl radicals, alkaryl radicals, and cycloalkyl radicals.

The preferred alkyl radicals are those containing from 1 to about 8 carbon atoms. Illustrative of these alkyl radicals are methyl, ethyl, propyl, isopropyl, butyl, isobutyl, tertiary butyl, pentyl, neopentyl, and the like. The preferred aryl radicals are those containing from 6 to 12 carbon atoms and include phenyl, naphthyl and biphenyl. The preferred aralkyl and alkaryl radicals are those containing from 7 to about 14 carbon atoms. Illustrative of these aralkyl and alkaryl radicals are benzyl, tolyl, ethylphenyl, and the like. The preferred cycloalkyl radicals are those containing from 4 to about 7 ring carbon atoms and include cyclopentyl, cyclobutyl, cyclohexyl, methycyclohexyl, and the like.

The preferred halogen radicals represented by $R^1$ and $R^2$ are chlorine and bromine.

The hydrocarbonoxy radicals represented by $R^1$ and $R^2$ are preferably the alkoxy and the aryloxy radicals. Preferred alkoxy radicals are those containing from 1 to about 8 carbon atoms. The preferred aryloxy radical is the phenoxy radical.

The divalent hydrocarbon radicals represented by X are selected from alkylene, alkylidene, cycloalkylene, and cycloalkylidene radicals.

The preferred alkylene radicals are those containing from 2 to about 8 carbon atoms. The preferred alkylidene radicals are those containing from 1 to about 8 carbon atoms. The preferred cycloalkylene and cycloalkylidene radicals are those containing from 4 to about 7 ring carbon atoms.

The preferred dihydric phenols of Formula II are those wherein b is one and X is selected from divalent hydrocarbon radicals.

In general, any ester forming reactive derivative of any difunctional carboxylic acid conventionally used in the preparation of linear polyesters may be utilized in the preparation of the copolyester-carbonates of the instant invention. In general, the ester forming reactive derivatives of the difunctional carboxylic acids which may be used include the derivatives of the aliphatic carboxylic acids, the derivatives of aliphatic-aromatic carboxylic acids, and the derivatives of the aromatic carboxylic acids. The acids, whose ester forming reactive derivatives are used in the present invention, are disclosed in U.S. Pat. No. 3,169,121.

The carboxylic acids, whose ester forming reactive derivatives are utilized in the instant invention, generally conform to the general formula

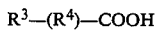
$$R^3\text{—}(R^4)\text{—}COOH \qquad \text{III.}$$

wherein $R^4$ is an alkylene, alkylidene, or cycloaliphatic group; an alkylene, alkylidene or cycloaliphatic group containing ethylenic unsaturation; an aromatic group such as phenylene, naphthylene, biphenylene, substituted phenylene, and the like; two or more aromatic groups connected through non-aromatic linkages such as alkylene or alkylidene groups; or a divalent aralkyl radical such as tolylene, xylylene, and the like. $R^3$ is either a carboxyl group or a hydroxyl group, preferably a carboxyl group. The letter q represents one where $R^3$ is a hydroxyl group and either zero or one where $R^3$ is a carboxyl group.

Preferred difunctional carboxylic acids, whose ester forming reactive derivatives are utilized in the instant invention, are the aromatic difunctional carboxylic acids, i.e., those wherein q is one and $R^4$ represents a divalent aromatic moiety containing radical. The preferred aromatic carboxylic acids, whose ester forming reactive derivatives are used in the instant invention, are those represented by the general formula

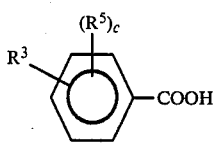

wherein:
$R^3$ is as defined supra;

$R^5$ is independently selected from halogen radicals, monovalent hydrocarbon radicals, and monovalent hydrocarbonoxy radicals; and c is selected from whole numbers having a value of from 0 to 4 inclusive.

The preferred halogen radicals represented by $R^5$ are chlorine and bromine.

The monovalent hydrocarbon radicals represented by $R^5$ are selected from alkyl radicals, aryl radicals, alkaryl radicals, aralkyl radicals, and cycloalkyl radicals.

The preferred alkyl radicals are those containing from 1 to about 8 carbon atoms. The preferred aryl radicals are those containing from 6 to 12 carbon atoms. The preferred aralkyl and alkaryl radicals are those containing from 7 to about 14 carbon atoms. The preferred cycloalkyl radicals are those containing from 4 to about 7 ring carbon atoms.

Preferred ester forming reactive derivatives of difunctional carboxylic acids are those represented by the general formula

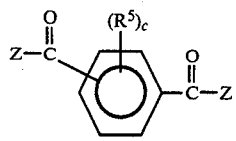

wherein:
$R^5$ and c are as defined hereinafore; and

Z independently includes halogen radicals, preferably bromine or chlorine, the $N_3$ radical, the CN radical, —$OR^6$ wherein $R^6$ is selected from monovalent hydrocarbon radicals,

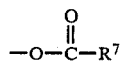

wherein $R^7$ is selected from monovalent hydrocarbon radicals, and

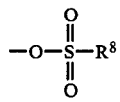

wherein $R^8$ is independently selected from monovalent hydrocarbon radicals.

The monovalent hydrocarbon radicals represented by $R^6$, $R^7$ and $R^8$ are the same as those defined for $R^5$ hereinafore.

Preferred reactive derivatives of difunctional carboxylic acids represented by Formula IVa are those wherein Z is independently selected from halogen radicals and —$OR^6$ radicals. The more preferred reactive derivatives of Formula IVa are those wherein Z is independently selected from halogen radicals.

Mixtures of two or more ester forming reactive derivatives of difunctional carboxylic acids as well as individual ester forming reactive derivatives of carboxylic acids may be employed. Thus, where the term ester forming reactive derivative of a difunctional carboxylic acid appears herein it is meant to include mixtures of two or more ester forming reactive derivatives of a difunctional carboxylic acid as well as individual ester forming reactive derivatives of difunctional carboxylic acids.

Likewise, mixtures of two or more different dyhydric phenols described supra, as well as individual dihydric phenols may be employed. Thus, where the term dihydric phenol is used herein it is meant to include mixtures of two or more different dihydric phenols as well as individual dihydric phenols.

Particularly useful ester forming reactive derivatives of difunctional carboxylic acids are the derivatives of isophthalic acid, terephthalic acid, and mixtures thereof, particularly the acid dihalides of these acids. A particularly useful mixture of the ester forming reactive derivatives of isophthalic acid and terephthalic acid is one which contains, in a weight ratio of the derivatives of isophthalic acid to terephthalic acid, from about 1:10 to about 9.8:0.2.

Particularly useful ester forming reactive derivatives of isophthalic acid, terephthalic acid, and mixtures thereof are isophthaloyl dichloride, terephthaloyl dichloride, and mixtures thereof.

The carbonate precursor may be a carbonyl halide, a carbonate ester, or a haloformate. The carbonyl halides which may be employed herein are carbonyl chloride, carbonyl bromide, and mixtures thereof. Typical of the carbonate esters which may be employed herein are diphenyl carbonate; di(halophenyl)carbonates such as di(chlorophenyl) carbonate, di(bromophenyl)carbonate, di(tribromophenyl)carbonate, etc.; di(alkylphenyl)carbonates such as di(tolyl)carbonate, etc.; di(naphthyl) carbonate, di(chloronaphthyl carbonate, phenyl tolyl carbonate, and the like, or mixtures thereof. The haloformates suitable for use herein include bis-haloformates of dihydric phenols (bis-chloroformates of hydroquinone), or glycols (bis-haloformates of ethylene glycol, neopentyl glycol, polyethylene glycol, etc.) The preferred carbonate precursor is carbonyl chloride, also known as phosgene.

The polyfunctional organic compounds that are co-reacted with the dihydric phenols, ester forming reactive derivatives of difunctional carboxylic acids, and the carbonate precursor to form the thermoplastic randomly branched copolyester-carbonate resins containing a relatively high ester content of the instant invention are well known compounds which are generally commercially available or may be readily prepared. These polyfunctional organic compounds function, in effect, as branching agents, thus forming the randomly branched copolyester-carbonates of the instant invention. The presence of these branching agents is critical to the instant invention. Without these branching agents the resultant copolyester-carbonate is a conventional prior art generally linear copolyester-carbonate which is generally not suitable for use as a blow molding resin.

These branching agents or polyfunctional organic compounds are generally aromatic and contain at least three functional groups which may be hydroxyl, carboxyl, carboxylic anhydride, halformyl, or mixtures thereof. Some illustrative non-limiting examples of these polyfunctional organic compounds include trimelitic anhydride, trimellitic acid, timellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, tetracarboxybutane anhydride, 4,4-bis(4-hydroxyphenyl) pentanoic acid, 4,4-dimethyl-2,4,6-tri-(4-hydroxyphenyl)heptane, 1,3,5-tri-(4-hydroxyphenyl)benzene, and the like.

These polyfunctional aromatic compounds, including those mentioned above, are disclosed, inter alia, in U.S. Pat. Nos. 3,525,712; 3,541,049; 3,544,514; 3,635,895; 3,816,373; 4,001,184; 4,204,047 and 4,194,953, all of which are hereby incorporated herein by reference.

In the preparation of the novel thermoplastic randomly branched copolyester-carbonate resins of this invention, the amount of the polyfunctional aromatic compound which is reacted with the dihydric phenol, the carbonate precursor, and the ester forming reactive derivative of the difunctional carboxylic acid is critical to the extent that the amount employed must be sufficient to result in a thermoplastic randomly branched copolyester-carbonate resin which is substantially free of crosslinking and which is suitable for use as a blow molding grade resin. Thus, the amount of said polyfunctional aromatic compound which is employed is an amount effective to produce a thermoplastic randomly branched copolyester-carbonate resin. Generally this amount is in the range of from about 0.001 to about 5 mole percent, and preferably from about 0.01 to about 2 mole percent, based on the amount of dihydric phenol employed. Generally, if the amount of polyfunctional aromatic compound employed is less than about 0.001 mole percent, based upon the moles of the dihydric phenol employed, the resulting polymer will not exhibit the degree of properties, such as, for example, non-Newtonian melt flow, melt strength, and the like, desired for blow molding and/or melt extrusion purposes.

The preparation of the branches copolyester-carbonates of the insatnt invention may be carried out by the processes used to produce the conventional straight chain copolyester-carbonates. These methods are well known in the art. Some of these methods, for example, are disclosed in the aforementioned U.S. Pat. No. 3,169,121.

Thus, for example, the preparation of the instant branched copolyester-carbonates may be accomplished by heterogeneous interfacial polymerization, solution condensation polymerization, melt condensation polymerization, transesterification, and the like.

The instant copolyester-carbonates may conveniently be prepared from (i) a carbonate precursor, (ii) at least one dihydric phenol, (iii) at least one ester forming reactive derivative of a difunctional carboxylic acid, and (iv) at least one polyfunctional aromatic compound by the interfacial polymerization technique. In accordance with the usual interfacial polymerization procedure the reactants are present in different liquid phases which are immiscible and which, in the preparation of the present polymers, consisitute two solvent midia. Thus, for example, the dihydric phenol is dissolved in one solvent medium, the ester forming reactive derivative of an aromatic dicarboxylic acid such as the acid dichloride is dissolved in a second solvent medium immiscible with the first, and the solutions are combined. Normally, an alkaline aqueous medium serves as the solvent for the dihydric phenol, and an organic solvent is utilized for the ester forming reactive derivative, said organic solvent being so chosen that it either dissolves the copolyesters produced or serves as a swelling medium. Also present during the reaction are catalysts and chain stoppers or molecular weight regulators. One particularly useful interfacial polymerization technique utilizes methylene chloride as the organic solvent, water as the aqueous medium, and phosgene as the carbonate precursor. In this system the dihydric phenol, ester forming reactive derivative of a difunctional carboxylic acid, water, methylene chloride and the polyfunctional organic compound are mixed together and phosgene is introduced into the reaction mixture, said reaction mixture being kept at the desired controlled pH by the addition of an aqueous caustic solution.

The catalysts which may be employed are any of the well known catalysts that aid the interfacial polymerization reaction in the formation of the copolyester-carbonates. Suitable catalysts include, but are not limited to, tertiary amines such as triethylamine, tripropyl amine, N,N-dimethyaniline, and the like; quaternary ammonium compounds such as tetraethylammonium chloride, cetyl triethyl ammonium bromide, tetra-n-heptylammonium iodide, benzyltriammonium chloride, and the like; and quaternary phosphonium compounds such as n-butyl triphenyl phosphonium bromide, tetrabutyl phosphonium chloride, and the like.

The molecular weight regulators which may be employed include monohydric phenols such as phenol, chroman-I [4-(2,4,4-trimethylchromanyl)phenol], p-t-butyl phenol, p-cumyl phenol, and the like.

The temperature at which the polymerization reaction proceeds may vary from below 0° C. to above 100° C. The reaction proceeds satisfactorily at temperatures from room temperature (25° C.) to about 50° C.

The amount of the ester froming reactive derivative of the difunctional carboxylic acid used in the preparation of the branched copolyester-carbonates of the instant invention is an amount effective to produce copolyester-carbonates containing relatively high amounts of ester bonds, i.e., from about 40 to about 90 mole percent ester bonds, preferably from about 45 to about 90 mole percent ester bonds, more preferably from about 50 to about 90 mole percent ester bonds, and most preferably from about 55 to about 90 mole percent ester bonds. Generally, this amount is from at least about 40 mole percent of said ester forming reactive derivative of the difunctional carboxylic acid, preferably from at least about 45 mole percent of said reactive derivative, more preferably from at least about 50 mole percent of said reactive derivative, and most preferably from at least about 55 mole percent of said reactive derivative. Mole percent of said ester forming reactive derivative is measured as the amount of said ester forming reactive derivative relative to the amount of dihydric phenol present in the reaction mixture containing said reactive derivative and said dihydric phenol. For example, a mxture containing 5 moles of bisphenol-A, 4 moles of isophthaloyl dichloride, and 1 mole of phosgene contains 80 mole percent of isophthaloyl dichloride.

The copolyester-carbonates of the instant invention may optionally have admixed therewith the commonly known and used additives such as antioxidants; antistatic agents; mold release agents; fillers such as glass fibers, talc, mica, clay, and the like; ultraviolet radiation absorbers such as the benzophenones and the benzotriazoles; hydrolytic stabilizers such as the epoxides disclosed in U.S. Pat. Nos. 3,489,716, 4,138,379, and 3,839,247, all of which are hereby incorporated by reference; impact modifiers; flame retardants; and the like.

Some particularly useful flame retardants are the alkali and alkaline earth metal salts of sulfonic acids. These types of flame retardants are disclosed, inter alia, in U.S. Pat. Nos. 3,933,734, 3,948,851, 3,926,908, 3,919,167, 3,909,490, 3,953,396, 3,931,100, 3,978,024, 3,953,399, 3,917,559, 3,951,910 and 3,940,366, all of which are hereby incorporated herein by reference.

DESCRIPTION OF THE PREFERRED EMBODIMENT

The following examples are set forth to further illustrate the present invention and are not to be considered as limiting the invention thereto. Unless otherwise specified, where parts or percents are mentioned they are parts or percents by weight.

The following examples illustrate the preparation of conventional branched copolyester-carbonates using difunctional carboxylic acids. These conventional copolyester-carbonates contain relatively low amounts of ester bonds. These examples fall outside the scope of the instant invention and are presented for comparative purposes only.

EXAMPLE 1

To a reactor vessel were added 40 grams (0.1754 mole) of bisphenol-A, 220 milliliters of water, 350 milliliters of methylene chloride, 0.79 gram of phenol, and 1 milliliter of triethylamine. Isophthalic acid, 8.74 grams (0.056 mole, 30 mole %), was then added to this reaction mixture. The pH of the reaction mixture was controlled at 6 by the use of an aqueous sodium hydroxide solution. Phosgene was then introduced into this reaction mixture at a rate of 0.5 gram per minute for a period of 10 minutes while maintaining the pH at 6 by the use os said aqueous caustic solution. At the end of this 10 minute phosgene addition period 0.3 gram of trimellityl trichloride branching agent was added to the reaction mixture. Phosgene was then again introduced into this reaction mixture at a rate of 1 gram per minute for a period of 15 minutes while maintaining the pH at about 9–10 by the use of said aqueous caustic solution. A slight emulsion formed at 6 minuted into this phosgene addition period and there was no pH control for about 2 minutes. The methylene chloride phase was separated from the aqueous phase, washed once with dilute (0.01N) aqueous HCl and twice with water. The polymer was precipitated with methanol. The intrinsic viscosity of the polymer was determined in methylene chloride at 25° C. to be 0.515 dl/gm. This polymer had a weight percent ester content of less than 3 percent and contained less than 2 mole percent ester bonds.

EXAMPLE 2

To a reactor vessel were added 40 grams (0.1754 mole) of bisphenol-A, 350 milliliters of methylene chloride, 220 milliliters of water, 0.5 gram of trimellitic anhydride, 16.5 grams (0.0993 mole, 25 mole percent) isophthalic acid, 1.25 milliliters of triethylamine, and 0.95 gram of phenol. The pH of this reaction mixture was controlled at 6 by the use of a 50% aqueous sodium hydroxide solution. 52.5 grams of phosgene were then introduced into this reaction mixture at a rate of 2 grams per minute while maintaining the pH at 6 by the use of said aqueous caustic solution. After 27 minutes the pH was raised to 11.5 and an additional 35 grams of phosgene were introduced at a rate of 2 grams per minute while maintaining the pH at 11.5. The methylene chloride phase was separated from the aqueous layer, diluted with an additional 500 milliliters of methylene chloride, washed once with dilute (0.01N) aqueous NaOH, once with dilute (0.01N) aqueous HCl, and twice with water. The polymer was precipitated with methanol. The intrinsic viscosity of the polymer was determined in methylene chloride at 25° C. to be 0.263 dl/gm. The polymer had an ester content of 16.5 weight percent and contained 12.3 mole percent ester bonds.

EXAMPLE 3

To a reactor vessel were added 91.5 grams (0.4013 mole) of bisphenol-A, 300 milliliters of methylene chloride, 250 milliliters of water, 0.5 gram of trimellitic anhydride, 1.25 milliliters of triethylamine, 0.95 gram of phenol, and 33 grams (0.1986 mole, 50 mole %) of isophthalic acid. The pH of this reaction mixture was controlled at 6 by the use of a 50% aqueous sodium hydroxide solution. 105 grams of phosgene were introduced into this reaction mixture at a rate of 2 grams per minute while maintaining the pH at 6 by the use of said aqueous caustic solution. After 53 minutes the pH was raised to 11.5. An emulsion formed after raising the pH to 11.5. An additional 35 grams of phosgene were introduced at a rate of 2 grams per minute while maintaining the pH at 11.5 by the use of said aqueous caustic solution. The emulsion could not be broken. Therefore, ½ of the resin solution was removed and to the remaining ½ were added 200 milliliters of methylene chloride, 50 milliliters of water, and 1 milliliter of triethylamine. Phosgene was then added at a rate of 2 grams per minute for a period of 20 minutes. The methylene chloride phase was then separated from the aqueous phase, and washed once with dilute (0.01N) aqueous NaOH, at which time a partial emulsion formed. The methylene chloride phase was then washed once with dilute (0.01N) aqueous HCl, and twice with water. The polymer was precipitated with methanol. The intrinsic viscosity of the polymer was determined in methylene chloride at 25° C. to be 0.180 dl/gm. The polymer had an ester content of 31 weight percent and contained 24 mole percent ester bonds.

EXAMPLE 4

To a reactor vessel were added 40 grams (0.1754 mole) of bisphenol-A, 220 milliliters of water, 350 milliliters of methylene chloride, 0.79 gram of t-butyl phenol, and 1 milliliter of triethylamine. Isophthalic acid, 17.5 grams (0.1052 mole, 60 mole %), was then added to this reaction mixture. The pH of the reaction mixture was controlled at 6 by the use of an aqueous sodium hydroxide solution. Phosgene was then introduced into the reaction mixture at a rate of 1 gram per minute for a period of 10 minutes while maintaining the pH at 6 with said aqueous caustic solution. After the end of this phosgene addition period 0.2 gram of trimellityl trichloride was added to the reaction mixture. The pH was then raised to 9. Additional phosgene was introduced into the reaction mixture at a rate of 1 gram per minute for a period of 10 minutes while maintaining the pH at 9-10 by the use of said aqueous caustic solution. An emulsion formed at 10 minutes into the phosgene addition and the pH became eratic. The emulsion was still present at the end of the phosgene addition period. The methylene chloride chloride phase could not be separated from the aqueous phase. The emulsion was broken by adding thereto 15 milliliters of HCl. The methylene chloride phase was separated from the aqueous phase, and was washed once with dilute (0.01N) HCl and twice with water. The polymer was precipitated with methanol. The intrinsic viscosity of the polymer was determined in methylene chloride at 25° C. to be 0.441 dl/gm The polymer had an ester content of 12 weight percent and contained 8.8 mole percent ester bonds.

The following examples illustrate the branched copolyester-carbonates of the instant invention.

EXAMPLE 5

Into a reactor vessel were added 40 grams (0.1754 mole) of bisphenol-A, 350 milliliters of of methylene chloride, 220 milliliters of water, 0.79 grams of t-butyl phenol, and 1 milliliter of triethylamine. The pH of the reaction mixture was controlled at 9-10 by the use of an aqueous sodium hydroxide solution. A solution containing 21.36 grams of isophthaloyl dichloride (0.1052 mole, 60 mole %), 0.2 gram of trimellityl trichloride, and 30 milliliters of methylene chloride, was added to the reaction mixture over a 9 minute period while maintaining the pH at 9-10 by the use of said aqueous caustic solution. Phosgene was then introduced into this reaction mixture at a rate of 1 gram per minute for a period of 10 minutes while controlling the pH at 10-11 with said aqueous caustic solution. The methylene chloride phase was separated from the aqueous phase, and was washed once with dilute (0.01N) aqueous HCl and twice with water. The polymer was precipitated with methanol. The intrinsic viscosity of the polymer was determined to be 0.604 dl/gm in methylene chloride at 25° C. The polymer had an ester content of 66 weight percent and contained 58 mole percent ester bonds.

EXAMPLE 6

Into a reactor vessel were added 91.5 grams (0.4013 mole) of bisphenol-A, 300 milliliters of methylene chloride, 250 milliliters of water, 0.95 gram of phenol, and 1.25 milliliters of triethylamine. The pH of this reaction mixture was controlled at 9 with a 50% aqueous sodium hydroxide solution. A solution containing 40.3 grams (0.1985 mole, 50 mole %) of isophthaloyl dichloride, 0.362 grams of trimellityl trichloride, and 50 milliliters of methylene chloride, was added to the reaction mixture over a 6 minute period while maintaining the pH at 9 with said aqueous caustic solution. Phosgene, 23 grams, was then introduced into the reaction mixture at a rate of 2 grams per minute while controlling the pH at 10.5-11 by the use of said aqueous caustic solution. The methylene chloride phase was then separated from the aqueous phase, and was washed once with dilute (0.01N) aqueous NaOH, once with dilute (0.01N) aqueous HCl, and twice with water. The polymer was precipitated with methanol. The intrinsic viscosity of the polymer in methylene chloride at 25° C. was determined to be 0.623 dl/gm. The polymer had an ester content of 57 weight percent and contained 48 mole percent ester bonds.

The ester content as well as the amount of ester bonds contained in the copolyester-carbonates of Examples 1-6 are set forth in Table I.

TABLE I

| Example No. | Ester Precursor | Amount of Ester Precursor Used | Ester Content of Polymer | Ester Bonds Present in Polymer |
|---|---|---|---|---|
| 1 (comparative) | isophthalic acid | 30 mole % | <3 wt. % | <2 mole % |
| 2 (comparative) | isophthalic acid | 25 mole % | 16.5 wt. % | 12.3 mole % |

TABLE I-continued

| Example No. | Ester Precursor | Amount of Ester Precursor Used | Ester Content of Polymer | Ester Bonds Present in Polymer |
| --- | --- | --- | --- | --- |
| 3 (comparative) | isophthalic acid | 50 mole % | 31 wt. % | 24 mole % |
| 4 (comparative) | isophthalic acid | 60 mole % | 12 wt. % | 8.8 mole % |
| 5 | isophthaloyl dichloride | 60 mole % | 66 wt. % | 58 mole % |
| 6 | isophthaloyl dichloride | 50 mole % | 57 wt. % | 48 mole % |

The data in Table I clearly illustrates that the instant branched copolyester-carbonates have a higher ester content than that of the prior art conventional copolyester-carbonate resins.

Obviously, other modifications and variations of the present invention are possible in light of the above teachings. It is, therefore, to be understood that changes may be made in the particular embodiment of the invention described and claimed which are within the full intended scope of the invention as defined by the appended claims.

What is claimed is:

1. Randomly branched thermoplastic copolyester-carbonate resin containing from about 40 to about 90 mole percent ester bonds exhibiting blow molding properties consisting essentially of the reaction products of:
   (i) a carbonate precursor;
   (ii) at least one dihydric phenol;
   (iii) at least one ester forming reactive derivative of a difunctional carboxylic acid; and
   (iv) from about 0.01 to about 2 mole percent, based on the amount of dihydric phenol used, of at least one polyfunctional aromatic branching agent.
2. The resin of claim 1 which contains from about 45 to about 90 mole percent ester bonds.
3. The resin of claim 2 which contains from about 50 to about 90 mole percent ester bonds.
4. The resin of claim 3 which contains from about 55 to about 90 mole percent ester bonds.
5. The resin of claim 1 wherein said polyfunctional aromatic branching agent is used in an amount effective to produce a randomly branched copolyester-carbonate resin.
6. The resin of claim 5 wherein said polyfunctional aromatic branching agent contains at least three functional groups selected from hydroxyl, carboxyl, carboxylic anhydride, haloformyl, and mixtures thereof.
7. The resin of claim 5 wherein said ester forming reactive derivative is selected from the reactive derivatives of isophthalic acid, terephtahlic acid, and mixture thereof.
8. The resin of claim 7 wherein said ester forming reactive derivative is selected from isophthaloyl dihalide, terephthaloyl dihalide, and mixtures thereof.
9. The resin of claim 8 wherein said ester forming reactive derivative is selected from isophthaloyl dichloride, terephthaloyl dichloride, and mixtures thereof.
10. The resin of claim 9 wherein said dihydric phenol is bisphenol-A.
11. The resin of claim 10 wherein said carbonate precursor is phosgene.
12. The resin of claim 11 wherein said branching agent is selected from trimellityl trichloride and trimellitic anhydride.
13. A process for preparing randomly branched thermoplastic copolyester-carbonate resin containing from about 40 to about 90 mole percent ester bonds exhibiting blow molding properties consisting essentially of reacting (i) a carbonate precursor, (ii) at least one dihydric phenol, (iii) at least one ester forming reactive derivative of a difunctional carboxylic acid, and (iv) from about 0.01 to about 2 mole percent, based on the amount of dihydric phenol used, of a polyfunctional aromatic branching agent.
14. The process of claim 13 wherein said ester forming reactive derivative is present in an amount effective to produce a resin containing from about 45 to about 90 mole percent ester bonds.
15. The process of claim 14 wherein said ester forming reactive derivative is present in an amount effective to produce a resin containing from about 50 to about 90 mole percent ester bonds.
16. The process of claim 15 wherein said ester forming reactive derivative is present in an amount effective to produce a resin containing from about 55 to about 90 mole percent ester bonds.
17. The process of claim 13 wherein said polyfunctional aromatic branching agent is present in an amount effective to produce a randomly branched thermoplastic copolyester-carbonate resin.
18. The process of claim 16 wherein said ester forming reactive derivative is selected from the reactive derivatives of isophthalic acid, terephthalic acid, and mixtures thereof.
19. The process of claim 16 wherein said ester froming reactive derivative is selected from isophthaloyl dihalides, terephthaloyl dihalides, and mixtures thereof.
20. The process of claim 19 wherein said ester forming reactive derivative is selected from isophthaloyl dichloride, terephthaloyl dichloride, and mixtures thereof.
21. The process of claim 20 wherein said dihydric phenol is bisphenol-A.
22. The process of claim 21 wherein said carbonate precursor is phosgene.
23. The process of claim 22 wherein said polyfunctional aromatic branching agent is selected from trimellityl trichloride and trimellitic anhydride.

* * * * *

UNITED STATES PATENT AND TRADEMARK OFFICE
CERTIFICATE OF CORRECTION

PATENT NO. : 4,621,132

DATED : November 4, 1986

INVENTOR(S) : Clayton B. Quinn and William Hilakos

It is certified that error appears in the above-identified patent and that said Letters Patent is hereby corrected as shown below:

Column 5, line 37 — "$R^3—(R^4)—COOH$"

should be — "$R^3—(R^4)q—COOH$"

Signed and Sealed this

Sixteenth Day of February, 1988

Attest:

DONALD J. QUIGG

Attesting Officer

Commissioner of Patents and Trademarks